United States Patent [19]

Faber

[11] Patent Number: 5,335,013
[45] Date of Patent: Aug. 2, 1994

[54] METHOD AND APPARATUS FOR VIDEO CAMERA IMAGE FILM SIMULATION

[76] Inventor: Robert A. Faber, 14054 Badger Ave., Sylmar, Calif. 91342

[21] Appl. No.: 821,790

[22] Filed: Jan. 16, 1992

[51] Int. Cl.$^5$ ............................................. H04N 5/253
[52] U.S. Cl. .................................... 348/104; 348/254
[58] Field of Search ................. 358/214, 216, 11, 140, 358/160, 54; H04N 5/253

[56] References Cited

U.S. PATENT DOCUMENTS

| | | | |
|---|---|---|---|
| 4,266,246 | 5/1981 | Waldron et al. | 358/216 |
| 4,771,342 | 9/1988 | Beesley | 358/335 |
| 4,901,161 | 2/1990 | Giovanella | 358/214 |
| 4,935,816 | 6/1990 | Faber | 358/160 |
| 4,998,167 | 3/1991 | Jaqua | 358/140 |

Primary Examiner—Joseph Mancuso
Assistant Examiner—Wendy R. Greening
Attorney, Agent, or Firm—Christie, Parker & Hale

[57] ABSTRACT

Video images are received by the present invention and processed to directly provide a video output having the appearance of a motion-picture-film-recorded image. The output of the invention may be provided directly for a television broadcast or recording on video tape. Simulation of film frames is provided by progressively scanning an imager at a rate similar to the frame rate of a motion picture film camera. Addition of filtered noise to provide the appearance of grain in photographic film and alteration of the apparent contrast provide variable artistic attributes which are adjustable for the desired film appearance.

23 Claims, 2 Drawing Sheets

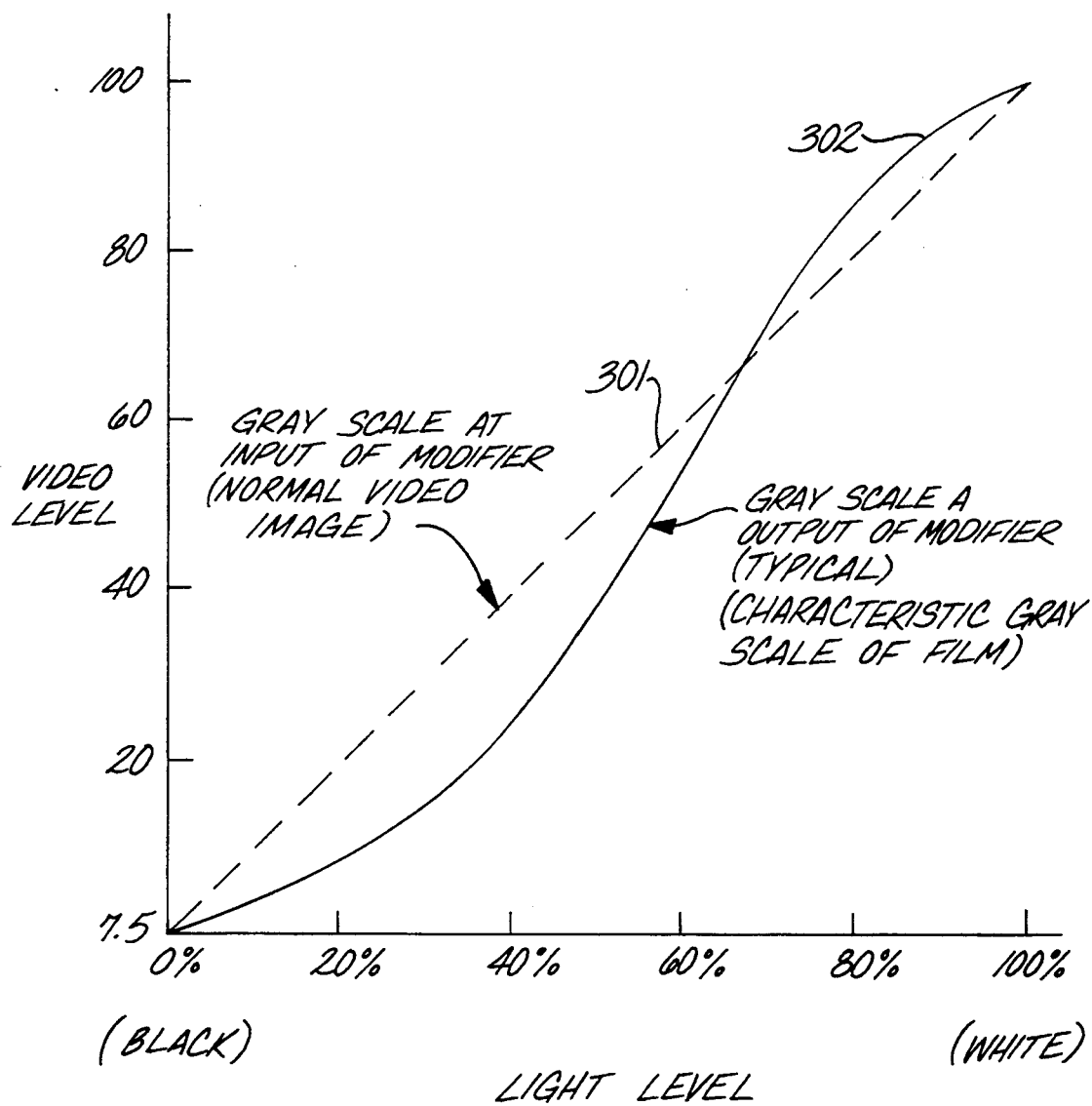

METHOD AND APPARATUS FOR VIDEO CAMERA IMAGE FILM SIMULATION

FIELD OF THE INVENTION

The present invention relates generally to the field of video camera images. More specifically, the invention provides a method and an apparatus for rendering a video camera image to provide the appearance of a motion-picture-film-recorded image to be output directly for television broadcast or recording on video tape.

PRIOR ART

Two basic approaches exist for recording of moving picture images. The first and older process employs photographic film, exposed using a motion picture camera, which is developed and printed to projection film which may then be shown using a projector and screen. Film frame rates for use in cameras and projectors have been standardized at 24 frames per second, which provides the appearance of near continuous motion to the human eye. Thirty frames per second is occasionally employed for films for television. The photographic film and various processing requirements to produce the end product are expensive and require skilled technicians and appropriate facilities for production.

Despite the cost, however, certain attributes of the film process provide an appearance which is aesthetically pleasing and, to some extent, may influence the artistic quality of the recorded images.

The chemical composition of the film and development processes create the "grain" of the film which alters the appearance. Furthermore, contrast of the images on the film varies nonlinearly as a function of light level or exposure. The combination of grain and contrast may be varied by processing techniques and original photographic film composition to provide the desired "look".

The second major process for recording motion pictures is video taping where images are recorded directly on magnetic tape from a television or video camera. Video recording has been designed to conform to standard television formats. In the United States, the basic television broadcast format comprises 525 lines of information, of which approximately 480 lines are displayed on a television screen. Scanning of the entire 525 lines is accomplished 30 times a second. Each television frame of 525 lines is broken into two separate fields of 262 lines and 263 lines. These "even" and "odd" fields are transmitted alternately at 60 fields per second. The lines of the even and odd fields are alternately interleaved to provide the full 525 line frame once every 1/30 second (thirtieth of a second) in a process known as interlacing. Many other standards in the world use 625 lines of information, and interlace 312 and 313 lines at 50 fields per second.

Unlike photographic motion picture film, video recording of images does not contain any grain, and for the most part, the gray scale of the signal of the video camera as recorded on video tape is essentially linear. Noise or "snow" in a video system is typically undesirable, and extensive design engineering is employed to minimize noise from electronic circuits in cameras, recorders and television sets for a clear picture. The flexibility present with photographic film in varying the artistic appearance of the final product by film and process selection is, for the most part, not present with video recording. However, the relative cost of video tape recording is significantly less than photographic film recording. The cost of the photographic film itself, developing and film-to-tape processing significantly exceeds the cost of video tape. On long running times, this cost can be dominant.

The less artistic appearance of video recorded images often results in a decision by producers or directors to use photographic film as opposed to video taping in spite of the above-mentioned advantages. Techniques to enhance the appearance of images recorded on video tape are therefore desirable to provide a combination of the economics of video taping with the desirable appearance of photographic film processes.

Some prior art systems exist which employ a combination of video and film technologies. A system known as "kinescope recording" was developed soon after the advent of television broadcasting to record a program for later rerun that was broadcast live using television cameras. The kinescope system basically recorded the pictures on a television screen using a photographic movie camera, and was rebroadcast by projecting the developed film before a television broadcast camera. To some extent, the kinescope system does add the film attributes when rebroadcast. However, the cost of the photographic film and processing is not eliminated, and the basic system concept inherently provides poor quality of image transfer (poor contrast, lack of detail and geometric distortions).

The second industry standard system, known as the "telecine" system, employs a scanning system to transfer images already recorded on photographic film to video tape. In the telecine system, one frame of film is scanned onto two consecutive video fields with a subsequent frame of film scanned onto three consecutive video fields. The "two-three" sequence is repeated to distribute 24 film frames onto 60 fields of video. Two fields of video are generated for every frame of film if the film is shot at 30 frames-per-second for American television (60 fields-per-second), or for 24 frames-per-second film transferred to a 50 field-per-second standard (typically overseas). This overcomes the basic timing incompatibility of standard photographic movie film and television/video tape. The kinescope lacks this capability. The telecine system does capture the desired film characteristics on the final video tape. However, the initial cost of photographic film and its associated processing is still required.

A third prior art example allows the use of video cameras and video tape for the initial recording of the movie picture images. The recorded video is then broken down into red, green and blue (RGB) components and scanned onto photographic film. The photographic film is then processed and returned to video tape using the telecine process. Eliminating the need for photographic film cameras provides some savings in this process. However, the cost of scanning equipment for the transfer from video to photographic film is added. The basic cost of the photographic film and its associated processing is also still present.

A fourth prior art example takes standard video images after they are generated from a video camera or after they are recorded on a video tape and, through inter-field interpolations, creates simulated film "frames" that have durations of two or three fields of video, as described in U.S. Pat. No. 4,935,816 issued Jun. 19, 1990 to the inventor of the present application, the disclosure of which is incorporated herein by reference. This method does not simulate the exact shutter duration of the film camera at 24 frames-per-second. Motion picture film cameras typically provide exposure durations that are approximately 1/48, 1/50, 1/60 of a second or less. The typical camera has an exposure duration of 1/50 second. This prior art example simulates a shutter speed of approximately 1/30 second.

In addition, this prior art invention renders simulated film frames that are not evenly spaced in time. The ideal duration from "film frame" to "film frame" is 1/24 second. Because the prior art makes simulated film frames from pairs of video fields that occur 1/30 second apart, and a field is skipped every 5 fields, the timing between simulated film frames alternates between 1/30 second and 1/20 second. The 1/20 second film frame is the 1/30 second field pair, plus the duration of one field (1/60 second).

SUMMARY OF THE INVENTION

The present invention provides a method and apparatus in which a video camera produces a video signal that has the aesthetically desirable appearance of film but with the economy of video technology. The video camera has an imaging device on which a lens forms an image. The imaging device is typically a solid state charge-coupled device (CCD). A circuit provides timing and synchronization for sampling the imaging device to generate an analog-sampled video image in a 24 progressively-scanned frames-per-second format where each frame comprises 625 lines. The sampled analog video image is processed through a video amplifier and converted into a digital-sampled video image by an analog-to-digital converter. A grain simulator provides random noise with filtering which simulates grain pattern imagery. Preferably, the noise is digital pseudorandom. The random noise is added to the digital-sampled video image and modified by a gray scale modifier. The gray scale modifier preferably includes a programmable read-only memory (PROM) for bit mapping the digital-sampled video image onto a gray scale curve reflecting the non-linear characteristics of photographic film. Circuitry is provided for converting the gray scale modified digital-sampled video image into conventional video formats. The conventional video formats typically include either analog or digital 525 lines/60 fields or 625 lines/50 fields video formats. In the present invention, for converting to the 525 lines/60 fields format, a circuit converts the 625-line to a 525-line format by interpolating adjacent lines that have been weighted. Circuitry then converts the 525-line format from progressively-scanned to interlaced-scanned format. A replication of the third field is added after every fourth field. The resulting digital output is in a 525 lines/60 fields format that can be converted to analog by a digital-to-analog converter. For a 625 lines/50 fields output, the gray scale modified digital-sampled video image is converted from progressively-scanned to interlaced-scanned. The resulting output is a digital output in 625 lines/48 fields format. Alternately, this digital output can be transformed by a digital-to-analog converter into an analog output in a 625 lines/48 fields format. Conversion to a 625 lines/50 fields output is accomplished by recording on a video tape recorder operating at approximately a 4% slower speed and playing back the tape at normal speed. An alternate embodiment of the present invention employs a 25 frame per second clocking for direct conversion to 625 lines 50 fields format.

BRIEF DESCRIPTION OF THE DRAWINGS

The foregoing features of the present invention will be better understood in consideration of the following detailed description of certain preferred embodiments, taken in conjunction with the accompanying drawings in which:

FIG. 2 is a schematic representation of the contrast function for film and video recording.

DETAILED DESCRIPTION

Figure 1:
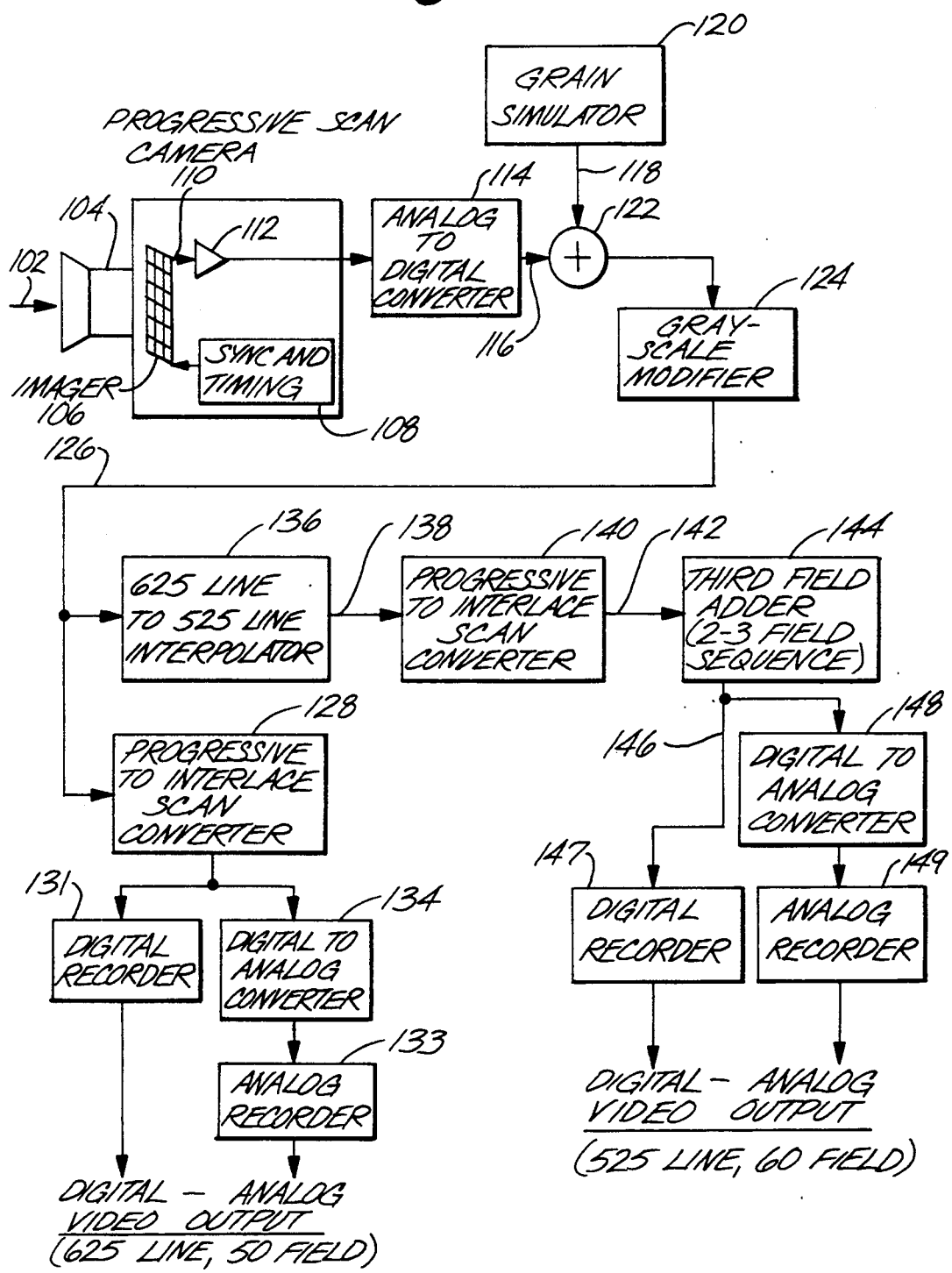
FIG. 1 is a schematic block diagram of the present invention.

Referring now to the drawings, FIG. 1 shows a block diagram of the basic elements of the invention.

An image 102 is focused by a lens 104 onto an imager 106. The imager is typically a solid state charge-coupled device (CCD). However, other imaging devices, such as a pickup tube, may be used. The synchronization and timing controller 108 controls the scanning, timing and outputting of the image signal 110 from the imager 106.

The image signal 110 is preferably a progressively-scanned video frame. In comparison, a conventional broadcast television camera generates two consecutive interlaced fields. Furthermore, 24 frames-per-second of the image signal are generated to simulate the frame rate of a motion picture camera. Most video standards require 25 or 30 interlaced-scanned frames-per-second. The imager 106 is exposed to light focused from the lens 104, typically for 1/50 second for each progressively-scanned frame.

The image signal 110 may comprise three signals for three images corresponding to the red, green and blue colors. For clarity, FIG. 1 shows the block diagram for one image signal.

The image signal 110 is amplified in a video amplifier 112 and communicated to an analog-to-digital converter 114. The image signal is then converted into a digital-sampled video image 116. The signal processing that subsequently follows in this invention is preferably done in a digital format. However, these processes may also be done in an analog format.

As will be described in greater detail subsequently, a "grain" signal 118 is provided by a grain simulator 120 and added to the digital-sampled video image 116 in a summer 122. The output signal from the summer 122 is modified by the gray scale modifier 124 to transform the video image to reflect the nonlinear characteristics of photographic film. The modified video image 126 from the gray scale modifier has the subjectively pleasing aspect present in photographic film imagery. In the embodiment shown, the gray scale modifier 124 is a non-linear amplifier comprising a PROM that provides a "look up" table for providing the gray scale transformation function. FIG. 2 shows such a gray scale modification function. A normal video gray scale is shown by curve 301 that provides linearly increasing video level with respect to light level exposure, while curve 302 demonstrates a nonlinearly increasing video level with light level characteristic of photographic film image recording. For low level or darker images, the film curve 302 is compressed providing a lower contrast between images of differing light values. The middle of the film curve 302 is expanded and provides an increased contrast between images of differing light values. As with the dark end of the scale, the light end of the film curve is compressed providing lower contrast between images of differing light levels. Because the gray scale modifier is digital, a variety of curves can be stored in the PROM to reflect the gray scale modification curves of differing types of films or to achieve different photographic effects. The desired gray scale modification curve can be selected by depressing an electronic switch (not shown).

The modified video image 126 is a digital video image that has a random noise added to it to simulate the grain of photographic film, and that has been modified to reflect the gray scale nonlinear characteristics of photographic film. This modified video image is in a 24 progressively-scanned frames-per-second format where each frame consists of 625 lines. The image is now converted to a conventional video format. The image could also be converted to other video formats as desired.

For conversion into a 625 lines/48 fields format, the modified video image 126 is inputted into a progressive-to-interlace scan converter 128. The scan converter 128 generates two interlaced fields of 312 and 313 lines each consecutively from the 625 line progressively-scanned frame. The conversion is done in the embodiment shown by storing the video image in a memory, and reading out every other line for the first field and reading the other lines for the second field. The video image is now represented in 48 fields-per-second, each field having 312 or 313 lines. The digital video output 130 in a 625 lines/48 fields format is input directly into a digital video tape recorder 131. The signal 130 is alternatively converted to an analog video output (625 lines/48 fields) 132 by a digital-to-analog converter 134. The analog signal 132 may be recorded directly on an analog video tape recorder 133.

In order to convert the modified video image to a 525 lines/60 fields format, the image is input into a 625-line to 525-line interpolator 136. The conversion from 625 lines to 525 lines is done by combining adjacent lines. For example, to generate an output line $L_0$, the output line may be created by combining adjacent video lines $V_1$, $V_2$, and $V_3$ and multiplying each by a weight factor $W_i$ and summing the three products, i.e., $L_0 = W_1*V_1 + W_2*V_2 + W_3*V_3$. The selection of the number of lines and the weight factors to be applied depends on the desired results. This interpolation is well known to those skilled in the art. For an example of using interpolation in high definition television, see "An HDTV Down Converter for Post Production," SMPTE Journal, February 1990 by Thorpe, Matsumoto & Kuboto. The 525-line video image 138 from the interpolator 136 is converted into an interlace format by progressive-to-interlace scan converter 140. The interlaced output 142 from the converter 140 is a sequence of interlaced fields designated A&B that corresponds to the sequence of frames. However, to achieve a 60 field-per-second format, an adder 144 adds a fifth field that is identical to the third field in a two-frame sequence. For example, if two consecutive frames generate fields A,B, A', B', the adder 144 adds a fifth frame that is identical the third field A'. Thus, the output of adder 144 becomes a 2-3 field sequence of A,B, A', B', A'. This output 146 is in a digital 525 lines/60 fields format that may be recorded on a digital video tape recorder 147. Alternatively, the output 146 can be converted into an analog video output of 525 lines/60 fields format in a digital-to-analog converter 148 for recording on recorder 149.

Video standards such as NTSC, PAL, and SECAM specify line and field rates and include color information encoding. These standards provide composite video signals for luminance and color information together in one signal. The present invention provides individual systems for red, green, and blue channels (individual components for each primary color). Timing for the system is established for compatibility with the referenced standards. The 24 progressively scanned frames per second employed by the present invention simulates the frame rate of standard movie film cameras. For compatibility, the NTSC standard requires 59.94 fields per second as a field rate for the "standard 525/60" system. Consequently, the present invention operates at 23.976 frames per second to allow 2 interlaced and alternately 3 interlaced fields to be rendered at the required 59.94 fields per second for compatibility with NTSC.

At this frame rate, the 48 field per second output rendered in the 625 line/48 field per second output are actually 47.952 fields per second (2×23.976). The PAL standard of 625 lines/50 fields per second is resolved by operating the video tape recorder at 4.096% slower speed thereby altering the 47.952 field per second rate to the exact 50 field per second rate when the tape is played back at normal speed.

In an alternate embodiment targeted for compatibility with the PAL standard, the present invention is operated at 25 progressively scanned frames per second for exact compatibility. In this embodiment recording speed adjustments for the 525/60 video tape recorders 147 and 149 comparable to that previously described are required.

Operation of the present invention at exactly 24 progressively scanned frames per second is employed in a third embodiment wherein recording speed adjustments for both 525/60 and 625/50 standards are accomplished through appropriate control of the digital or analog recorders.

The simulation of film "grain" in the processed video output is accomplished in the present invention through the use of clipped white noise. The "grain" in film-recorded imagery tends to appear as random dark spots on each frame of film. By clipping the positive swing of random white noise, random amplitude negative-going spikes are created. When these spikes are summed into the real-time video signal as the "grain" signal, the sum signal provides an appearance of random dark spots on a picture portion of each line. The grain will not appear as video noise or "snow" which is different for every video field. The grain pattern will be constant for the two or three fields of video that correspond to a single film frame.

Having now described the invention in detail as required by the patent statutes, those skilled in the art will recognize modifications to the embodiments described herein for specific applications. Such modifications, including differing scanning rates or differing lines of the imager and different video outputs, are within the scope and spirit of the invention as defined in the following claims.

What is claimed is:

1. A video camera for generating a video signal to simulate the appearance of film-recorded images comprising:

means for receiving an optical image;

means for sampling the receiving means to generate a sampled video image of 24 progressively-scanned single field frames per second;

means for modifying the sampled video image to simulate the nonlinear gray scale of film; and means for converting the modified video image into a video image of an interlaced format.

2. The video camera of claim 1 wherein the video image is an analog video image and the video camera further comprises means for converting the analog-sampled video image into a digital-sampled video image.

3. The video camera of claim 1 further comprising means for adding clipped white noise for grain simulation to the sampled video image.

4. The video camera of claim 1 wherein the 24 progressively-scanned frames per second each comprise 625 lines.

5. The video camera of claim 4 wherein the converting means comprises:
   means for converting each frame of sampled video image into a 525 line format;
   means for converting the video image from a progressively-scanned format into an interlaced-scanned format, the interlaced-scanned format having four fields;
   means for adding a fifth field, identical to the third field, to the video image after the fourth field; and
   means for outputting the five-field video image.

6. The video camera of claim 5 wherein the converting means further comprises means for converting the five-field video image into an analog five-field video image.

7. The video camera of claim 4 wherein the interlaced format has two fields, and further comprising means for outputting the two-field video image.

8. The video camera of claim 7 wherein the converting means further comprises means for converting the four-field video image into an analog four-field video image.

9. The video camera of claim 1 wherein an output of the converting means comprises an analog 525 lines/60 fields format.

10. The video camera of claim 1 wherein an output of the converting means comprises a digital 525 lines/60 fields format.

11. The video camera of claim 1 wherein an output of the converting means comprises an analog 625 lines/48 fields format.

12. The video camera of claim 1 wherein an output of the converting means comprises a digital 625 lines/48 fields format.

13. The video camera of claim 1 wherein the interlaced format is selected from a plurality of output formats.

14. A video camera for generating a video signal to simulate the appearance of film-recorded images comprising:
   an imaging device;
   means for sampling the imaging device to generate an analog-sampled video image in a 24 progressively-scanned frames-per-second format, each frame comprising 625 lines;
   an analog-to-digital convertor for converting the analog-sampled video image into a digital-sampled video image;
   means for adding filtered noise for grain simulation to the digital sampled video image;
   means for modifying the digital sampled video image to simulate the nonlinear gray scale of film; and
   means for selectively converting the modified video image into a video image of one of a plurality of second interlaced formats, the plurality of second formats including analog 525 lines/60 fields, digital 525 lines/60 fields, analog 625 lines/48 fields, and digital 625 lines/48 fields formats.

15. A method for generating a video signal to simulate the appearance of film-recorded images comprising the steps of:
   receiving an optical image;
   sampling the optical image;
   generating a sampled video image of 24 progressively-scanned single field frames per second from the sampled optical image;
   modifying the sampled video image to simulate the nonlinear gray scale of film; and
   converting the modified video image into a video image of an interlaced format.

16. The method of claim 15 further comprising the steps of generating an analog-sampled video image and converting the sampled analog video image into a digital-sampled video image.

17. The method of claim 15 further comprising the step of adding clipped white noise for grain simulation to the sampled video image.

18. The method of claim 15 wherein the 24 progressively-scanned frames per second each comprise 625 lines.

19. The method of claim 15 wherein the interlaced format comprises an analog 525 lines/60 fields format.

20. The method of claim 15 wherein the interlaced format comprises a digital 525 lines/60 fields format.

21. The method of claim 15 wherein the interlaced format comprises an analog 625 lines/48 fields format.

22. The method of claim 15 wherein the interlaced format comprises a digital 625 lines/48 fields format.

23. A videosystem for generating a video signal to simulate the appearance of film recorded images comprising:
   means for receiving an optical image;
   means for sampling the receiving means to generate a sampled video image of 24 progressively-scanned single field frames per second;
   means for modifying the sampled video image to simulate the nonlinear gray scale of film;
   means for converting the modified video image to a video image of an interlaced format; and
   means for recording the video image, said recording means having adjustable record and play-back speeds.

* * * * *

UNITED STATES PATENT AND TRADEMARK OFFICE
CERTIFICATE OF CORRECTION

PATENT NO. : 5,335,013
DATED : August 2, 1994
INVENTOR(S) : Robert A. Faber

It is certified that error appears in the above-indentified patent and that said Letters Patent is hereby corrected as shown below:

In the Drawings:

FIGURE 1, insert the number "130" on the line below block No. 128 labeled "PROGRESSIVE TO INTERLACE SCAN CONVERTER"; and insert the number -- 132 -- on the line below block No. 134 labeled "DIGITAL TO ANALOG CONVERTER."

(See page 2 for the drawing figure).

UNITED STATES PATENT AND TRADEMARK OFFICE
CERTIFICATE OF CORRECTION

PATENT NO. : 5,335,013
DATED : August 2, 1994
INVENTOR(S) : Robert A. Faber

It is certified that error appears in the above-indentified patent and that said Letters Patent is hereby corrected as shown below:

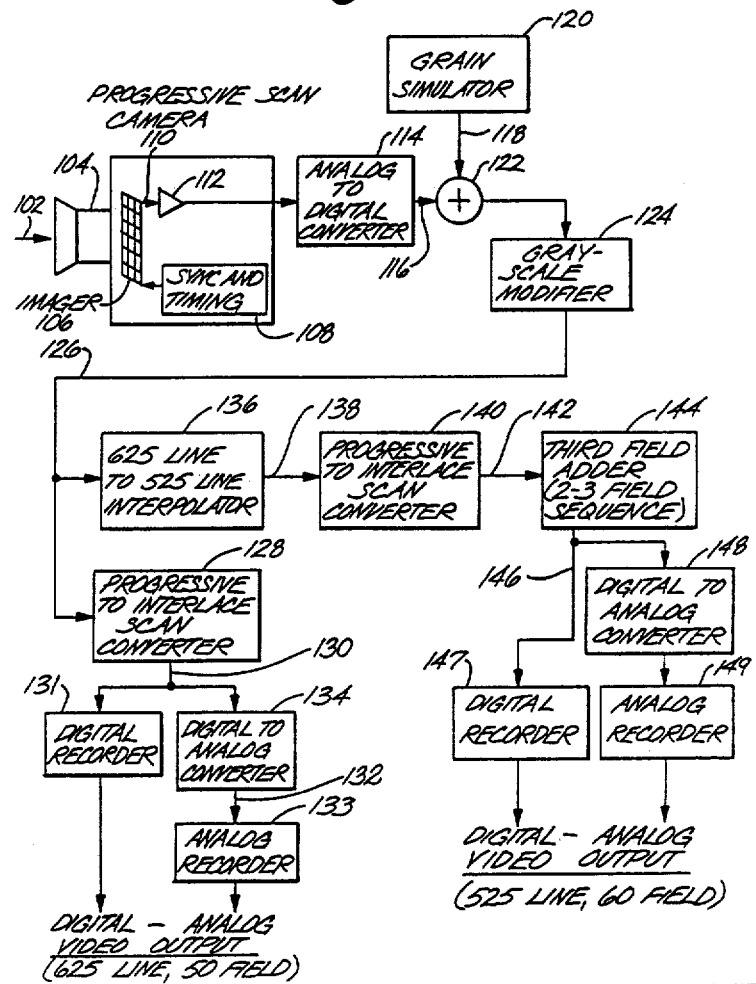

UNITED STATES PATENT AND TRADEMARK OFFICE
CERTIFICATE OF CORRECTION

PATENT NO. : 5,335,013
DATED : August 2, 1994
INVENTOR(S) : Robert A. Faber

It is certified that error appears in the above-indentified patent and that said Letters Patent is hereby corrected as shown below:

Column 3, line 45, change "formats, The" to
-- formats. The --.

Signed and Sealed this

Eleventh Day of April, 1995

Attest:

BRUCE LEHMAN

Attesting Officer

Commissioner of Patents and Trademarks